United States Patent [19]
Fukuda et al.

[11] Patent Number: 5,369,269
[45] Date of Patent: Nov. 29, 1994

[54] HUMAN BODY DETECTION SYSTEM

[75] Inventors: Masahiko Fukuda; Hiromi Numakura, both of Kamakura; Koji Iio; Akira Hidaka, both of Shizuoka, all of Japan

[73] Assignee: Mitsubishi Denki Kabushiki Kaisha, Tokyo, Japan

[21] Appl. No.: 22,120

[22] Filed: Mar. 18, 1993

[30] Foreign Application Priority Data

Apr. 21, 1992 [JP] Japan .................................. 4-126700

[51] Int. Cl.⁵ .............................................. G01V 9/04
[52] U.S. Cl. ................... 250/221; 250/342; 340/567
[58] Field of Search ............... 250/221, 222.1, 338.1, 250/342; 340/565, 567, 555, 556, 557

[56] References Cited

U.S. PATENT DOCUMENTS

| | | |
|---|---|---|
| 4,275,303 | 6/1981 | Mudge . |
| 4,321,594 | 3/1982 | Galvin et al. . |
| 4,346,427 | 8/1982 | Blissett et al. . |
| 4,451,734 | 5/1984 | St. Jean et al. . |
| 4,507,654 | 3/1985 | Stolarczyk et al. . |
| 4,523,095 | 6/1985 | Keller-Steinbach . |
| 4,551,711 | 11/1985 | Akiyama et al. . |
| 4,576,481 | 3/1986 | Hansen . |
| 4,578,584 | 3/1986 | Baumann et al. . |
| 4,612,442 | 9/1986 | Toshimichi . |
| 4,650,997 | 3/1987 | Yawn et al. . |
| 4,752,799 | 6/1988 | Stauffer . |
| 4,768,873 | 9/1988 | Webb . |
| 4,769,545 | 9/1988 | Fraden . |
| 4,772,797 | 9/1988 | Kahl et al. . |
| 4,841,284 | 6/1989 | Biersdorff ............... 340/567 |
| 4,896,039 | 1/1990 | Fraden . |
| 4,902,893 | 2/1990 | Burrer . |
| 4,912,748 | 3/1990 | Horii et al. ............... 250/221 |
| 4,990,783 | 2/1991 | Muller et al. . |
| 5,007,432 | 4/1991 | Keller et al. . |
| 5,077,549 | 12/1991 | Hershkovitz et al. . |
| 5,221,919 | 6/1993 | Hermans ............... 250/342 |

FOREIGN PATENT DOCUMENTS

| | | |
|---|---|---|
| 2624983 | 6/1989 | France . |
| 591733 | 9/1977 | Germany . |
| 3500860 | 7/1986 | Germany . |
| 60-15836 | 12/1985 | Japan . |
| 1-88392 | 4/1989 | Japan . |
| 1-227987 | 9/1989 | Japan . |

OTHER PUBLICATIONS

Cardillo et al., IEEE Transactions on Pattern Analysis ..., vol. 13, No. 8, Aug. 1991, pp. 809–813.

*Primary Examiner*—David C. Nelms
*Attorney, Agent, or Firm*—Wolf, Greenfield & Sacks

[57] ABSTRACT

In order to detect a position where a human body may exist with the aid of a single infrared detector, a human body detecting system comprises a condenser for the provision of a plurality of effective detection regions each having different areas and provided within partial detection regions. When the human body moves across one of the effective detection regions, the infrared detector detects the infrared rays radiated from the human body to produce signals. Accordingly, the thus output signals present different frequencies depending on the effective detection regions, whereby the differences in the fluctuation times of the output signals and in the frequencies are discriminated by a decision apparatus to consequently detect which partial detection region includes the human body.

9 Claims, 10 Drawing Sheets

Fig. 7A  Fig. 7B

HUMAN BODY DETECTION SYSTEM

BACKGROUND OF THE INVENTION

1. Field of the Invention

The present invention relates to a system condensing infrared rays for the detection of a human body.

2. Description of the Related Arts

A conventional system for detecting a human body shown in FIGS. 12 and 13, by way of example, is disclosed in Japanese Laid-open Patent Publication No. Hei-1-227987. FIG. 12 is a block diagram, while FIG. 13 is a view explaining a manner detecting a position of the human body within a room.

In the figures, reference numerals 1A to 1C denote partial detection regions each having an elongated zone, reference numerals 3A to 3C designate condensers for gathering light rays emitted from the partial detection regions, reference numerals 4A to 4C indicate infrared detectors for selectively detecting infrared rays radiated from the human body, reference numeral 5 signifies a plurality of amplifiers for amplifying outputs from the infrared detectors 4A to 4C, and reference numeral 6 represents a plurality of binarizing apparatus for comparing the amplified signals with a reference value for binarization.

In the known human body detection system thus configured, the light rays condensed by the condensers 3A are directed through the partial detection region 3A defined as an elongated zone to the infrared detector 4A. The infrared detector 4A detects a variation in the infrared rays radiated from the human body with the aid of an optical filter, and transmits detection signals to tile associated amplifier 5. At that time, the infrared detector 4A selectively detects an infrared rays having a wavelength in the order of 10 micron which is a center wavelength of the infrared rays radiated from the human body.

The amplifier 5 receives the detection signals to amplify them to a predetermined level. This amplification factor depends on a distance between the system and the human body to be detected since light attenuates in proportion to the square of the distance. Thus amplified signals are binarized by a binarization apparatus 6 having a reference value equal to a signal level at the farthest distance within the partial detection region 1A, thereby judging "0" or "1" based on voltage levels of the signals.

When the human body exists within the partial detection region 1A of the condenser 3A in this way, a corresponding output of the binarization apparatus 6 is generated as a human body position signal. In the same manner, when the human body exists within the partial detection region 1B or 1C of the condenser 3B or 3C, the respective human body position signals are separately detected irrespective of the different amplification factor of the amplifier 5 and the different reference value of the binarization apparatus 6. As a result, with any movement of the human body across any one of the partial detection regions 1A to 1C as shown in FIG. 13, it can be detected which region includes the human body.

in the conventional human body detection system as described above, a plurality of infrared detectors 4A to 4C, amplifiers 5 and binarization apparatus 6 must be provided corresponding to the partial detection regions 1A to 1C, respectively, and hence the number of the constituent elements is increased, which disadvantageously results in a higher production cost and miniaturization difficulty.

SUMMARY OF THE INVENTION

The present invention was conceived to overcome the above deficiencies, the object of which is to provide a human body detecting system having a single infrared detector and amplifier designed to detect a human body within a plurality of partial detection regions, thereby reducing the number of constituent elements and realizing an easy miniaturization at a low cost.

The human body detection system according to the first aspect of the present invention comprises a condenser including a plurality of partial detection regions each having an elongated zone, and a plurality of effective detection regions each having a different area and correspondingly contained within each of the partial detection regions, the condenser condensing infrared rays radiated from the human body which may exist within one of the effective detection regions; an infrared detector for converting the infrared rays condensed on the effective detection regions through the condenser into electric signals; an amplifier for amplifying the electric signals derived from the infrared detector; a decision apparatus which detects fluctuation times or Frequencies of the electric signals amplified by the amplifier and corresponding to the effective detection regions, specifies the effective detection regions having areas corresponding to thus detected fluctuation times or frequencies, and specifies partial detection regions containing the effective detection regions to judge a position where the human body may exist.

Furthermore, the human body detection system according to the second aspect of the present invention comprises a condenser including a plurality of partial detection regions each having an elongated zone, and a plurality of effective detection regions each contained within one of the partial detection regions, the partial detection regions each containing at least one of the effective detection regions whose number and area vary; the condenser condensing infrared rays radiated from the human body which may exist within one of the effective detection regions; an infrared detector for converting the infrared rays condensed on the effective detection regions through the condenser into electric signals; an amplifier for amplifying the electric signals derived from the infrared detector; and a decision apparatus which detects fluctuation times or frequencies and the number of the electric signals amplified by the amplifier and corresponding to the effective detection regions, specifies the effective detection regions having areas corresponding to thus detected fluctuation times or frequencies and having the number of regions corresponding to thus detected number of the electric signals, and specifies partial detection regions containing the effective detection regions to judge a position where the human body may exist.

In the first aspect of the present invention, the condenser includes a plurality of partial detection regions each having an elongated zone, and a plurality of effective detection regions each having a different area and correspondingly contained within each of the partial detection regions, and condenses infrared rays radiated from the human body which may exist within one of the effective detection regions. Hence, the infrared rays from each of the effective detection regions are converted into electric signals to thereby specify the presence of the human body within any one of the effective detection regions depending on the frequencies or the fluctuation times of the electric signals, in other words, to specify the partial detection region in which the human body exists.

Furthermore, in the second aspect of the present invention, the condenser includes a plurality of partial detection regions each having an elongated zone, and a plurality of effective detection regions each contained within one of the partial detection regions, the partial detection regions each containing at least one of the effective detection regions whose number and area vary, and condenses infrared rays radiated from the human body which may exist within one of the effective detection regions. Hence, the infrared rays from the effective detection regions are converted into electric signals to specify the presence of the human body within any one of effective detection regions depending on the frequencies or the fluctuation times of the electric signals and the number of the electric signals, in other words, to specify the region in which the human body exists.

BRIEF DESCRIPTION OF THE DRAWINGS

FIGS. 7A, 7B and 7c are explanatory diagrams of synthesis of the output waves with respect to the fluctuation in the infrared inputs obtained when using the infrared detector of the present invention, in particular, a pyroelectric sensor;

DESCRIPTION OF THE PREFERRED EMBODIMENTS

Embodiment 1

In the present invention, elements corresponding to those in the conventional apparatus are correspondingly referenced.

Figure 1:
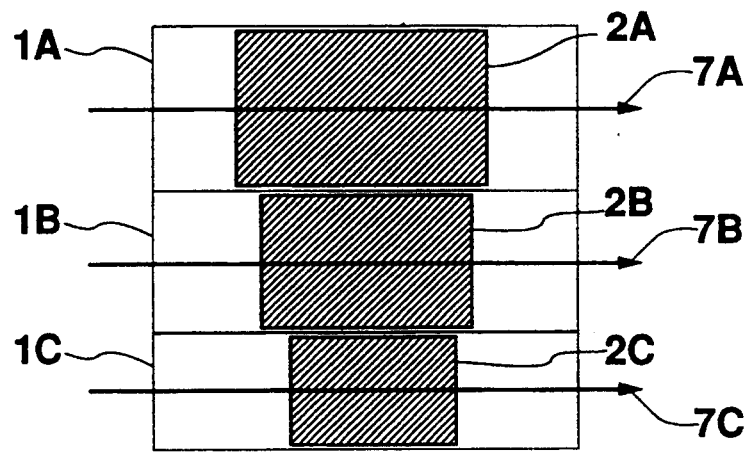
FIG. 1 shows a configuration of detection regions which is a first embodiment of the present invention.

Referring first to FIG. 1, reference numerals 2A to 2C denote effective detection regions to be contained in partial detection regions 1A to 1C, respectively, whose areas are reduced in alphabetical order. Directions where a human body moves in the partial detection regions 1A to 1C are designated by reference numerals 7A to 7C, respectively.

Figure 2:
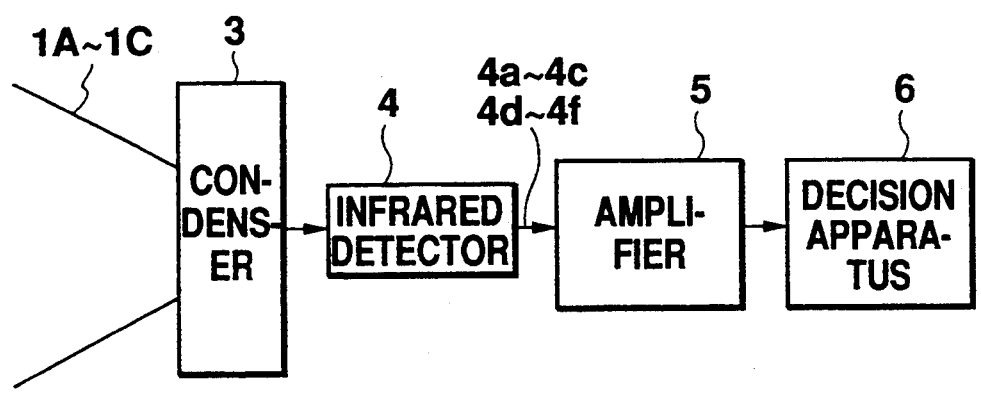
FIG. 2 is an overall block diagram showing the first and second embodiment of the present invention.

Referring next to FIG. 2, reference numeral 3 denotes a condenser which provides the partial detection regions 1A to 1C as well as the effective detection regions 2A to 2C as shown in FIG. 1. Reference numeral 4 designates an infrared detector including, for example, a pyroelectric sensor and a thermopile element for converting, in particular, far-infrared radiation emitted from the condenser into electric signals for issuing in the form of outputs 4a to 4c. Reference numeral 5 signifies an amplifier which band-limitedly amplifies outputs 4a to 4c from the infrared detector 4, and reference numeral 6 indicates a decision apparatus which detects frequencies and output time with respect to the thus amplified output signals.

Figure 3:
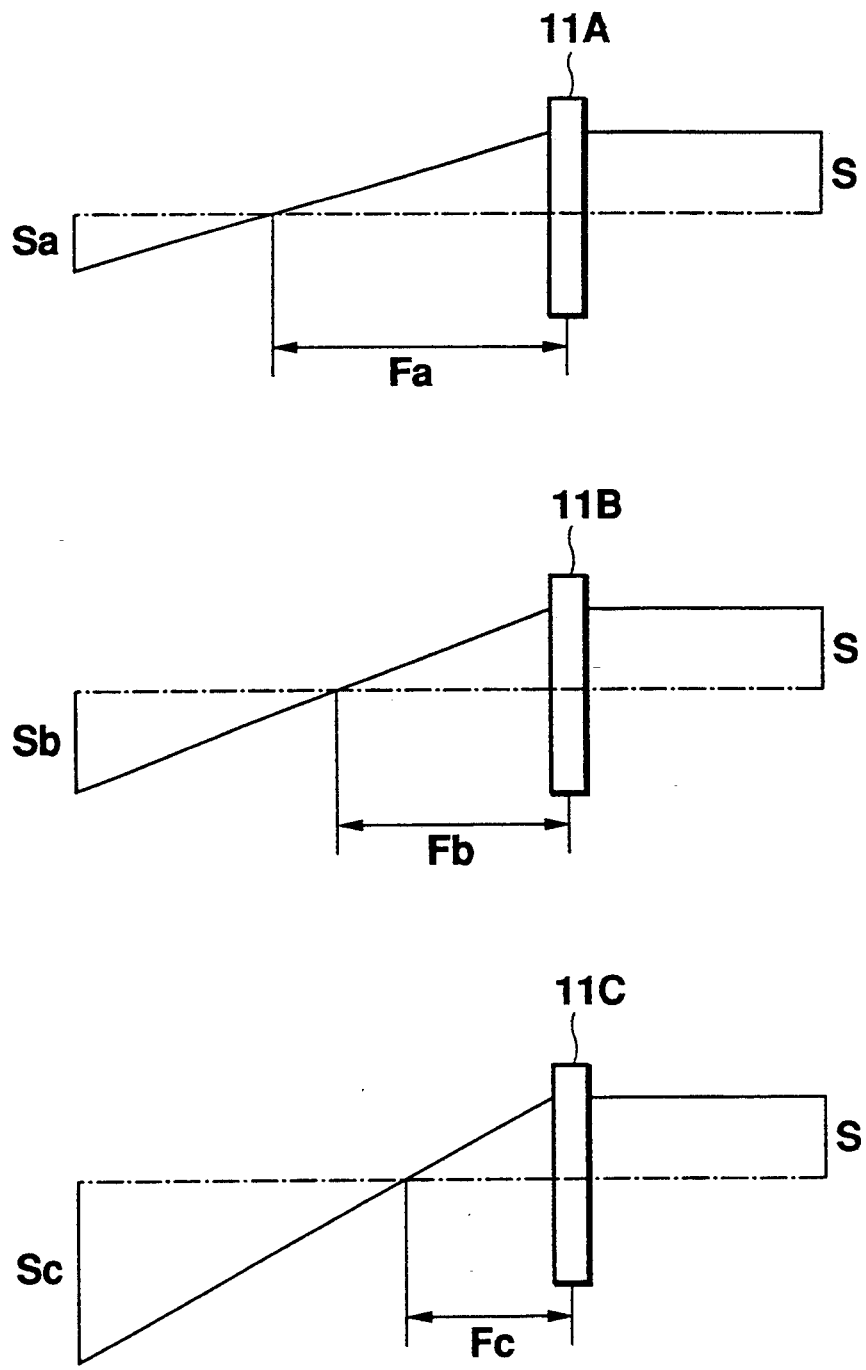
FIG. 3 is an explanatory diagram showing the light condensing of a condenser illustrated in FIG. 2.

In FIG. 3, reference numerals 11A to 11C denote multi-segment Fresnel lenses (or alternatively multisegment reflecting mirrors may be employed) each having different focal lengths Fa to Fc, respectively. Sa to Sc represent areas of the effective detection regions 2A to 2C, respectively, while S represents an area of a light receiving element. Thus, infrared radiations (in particular, far infrared radiations) from the effective detection region 2A to 2C each having the different areas are gathered to obtain inputs of a uniform area S of the light reception element. Accordingly, a single condenser 3 may be used for collecting a plurality of far infrared rays.

Figure 4:
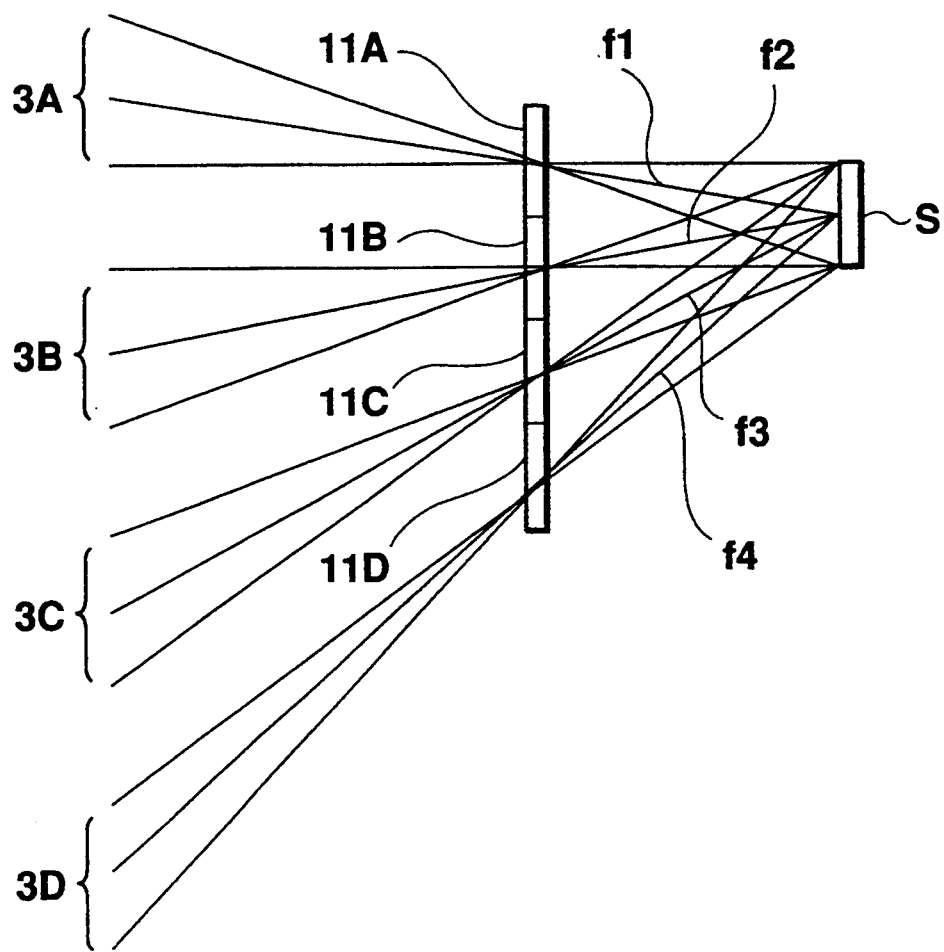
FIG. 4 is an explanatory diagram showing the light condensing through a plurality of Fresnel lenses provided within the condenser of the present invention.

More specifically, the Fresnel lenses of the condenser 3 and the infrared detector 4 in accordance with the present invention are fixed for use. Therefore, in the case of the provision of four partial detection regions 3A to 3D as shown in FIG. 4, Fresnel lenses 11A to 11D having different optical centers or focal lengths (f1 to f4) may be arranged in the same plane (or on the same curved surface not shown) so as to receive the rays on a single sensor light receiving surface S.

The action of this embodiment will now be described with reference to FIG. 5. The following is of the case where the far infrared rays, in particular, among the infrared rays radiated from the human body are condensed to detect the presence of the human body.

First, the movement of the human body across partial detection regions 1A to 1C in a room brings about a change in the distribution of the far infrared rays to be radiated from the human body within the room. This variation in the distribution of the far infrared rays is directed to the infrared detector 4 by way of the condenser 3. In response to the variation in the far infrared rays across the partial infrared rays 1A to 1C, the infrared detector 4 generates outputs 4a to 4c represented by sinusoidal waves oscillating up and down from the reference voltage as shown in FIG. 5.

The output action of the infrared detector 4 in accordance with the present invention will next be described with reference to FIG. 6.

Figure 6A:
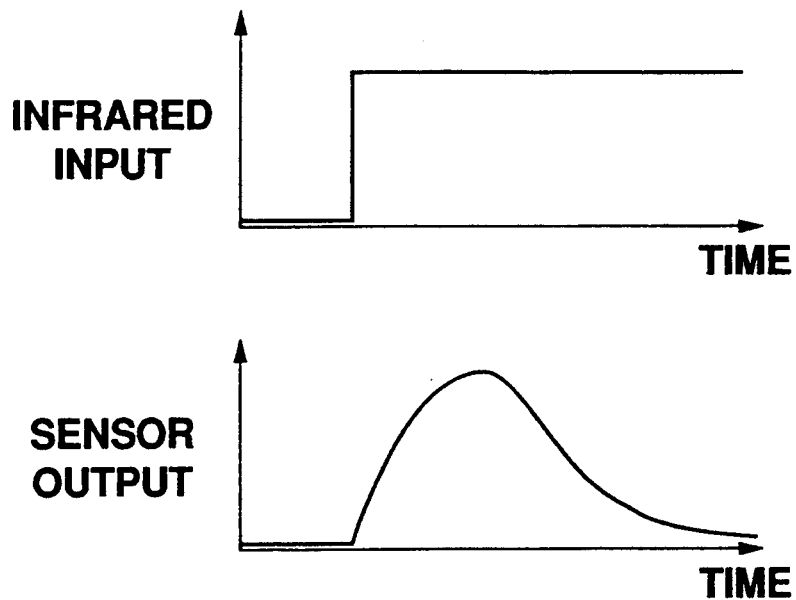
FIGS. 6A and 6B illustrate fluctuations in the sensor outputs corresponding to fluctuations in the infrared inputs of the infrared detector of the present invention.
Figure 6B:
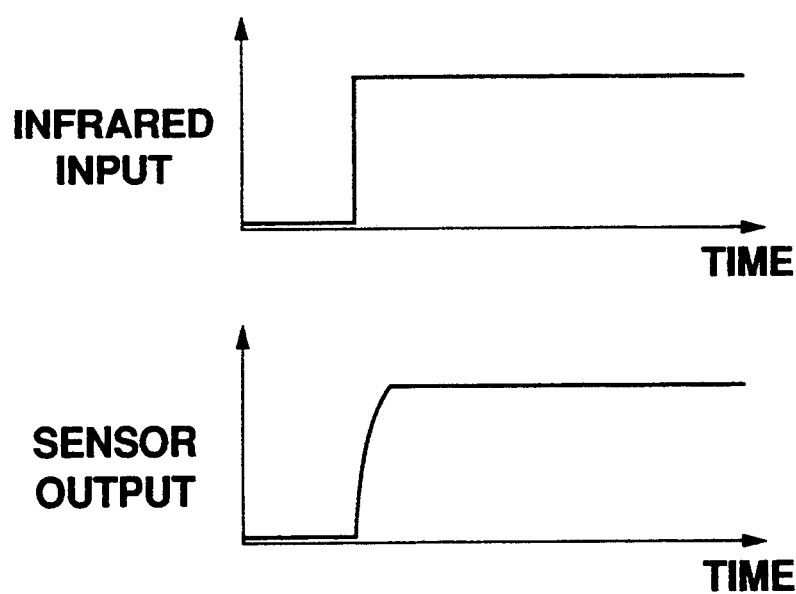

Depending on the alternative of the pyroelectric sensor or the thermopile sensor to be used as the infrared detector 4, waveforms of signals to be output are slightly different from each other. That is, the pyroelectric sensor is an element having so-called differential output characteristics and hence producing the output as shown in FIG. 6A for step input, while the thermopile sensor is an element presenting D. C. type output characteristics as is clear from FIG. 6B.

Figure 7C:
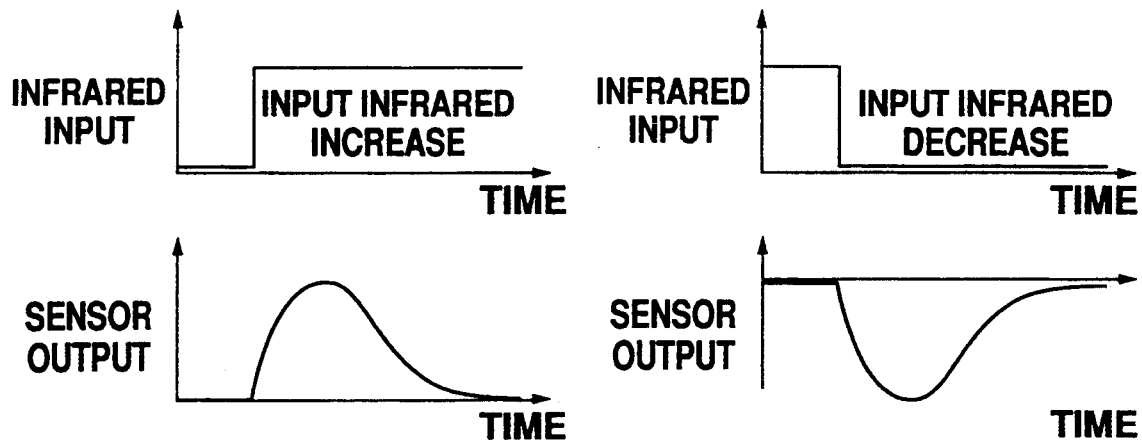
Figure 7C:
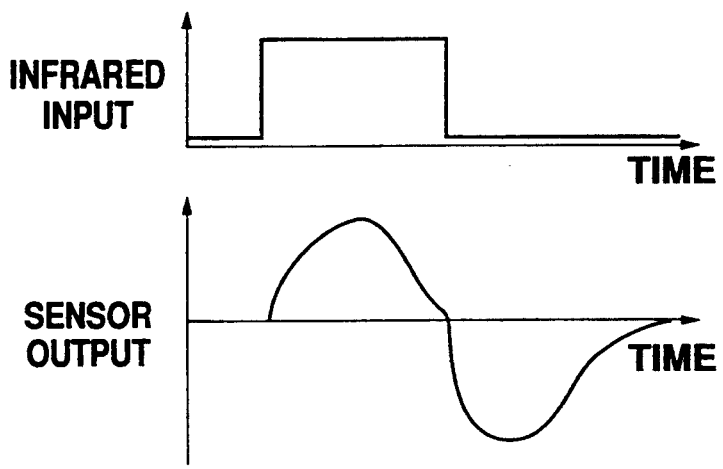

Consequently, if the pyroelectric sensor is used as the infrared detector 4 in the present invention, there is obtained a waveform fluctuating above the reference voltage as shown in FIG. 7A in the presence of the human body within the partial detection regions. On the contrary, there appears a waveform fluctuating below the reference voltage as shown in FIG. 7B in the absence of the human body within the partial detection region. As a result, when the human body moves across the partial detection regions, there emerges a waveform obtained by synthesizing FIGS. 7A and 7B, or an output approximating the sinusoidal wave as shown in FIG. 7C.

Figure 8:
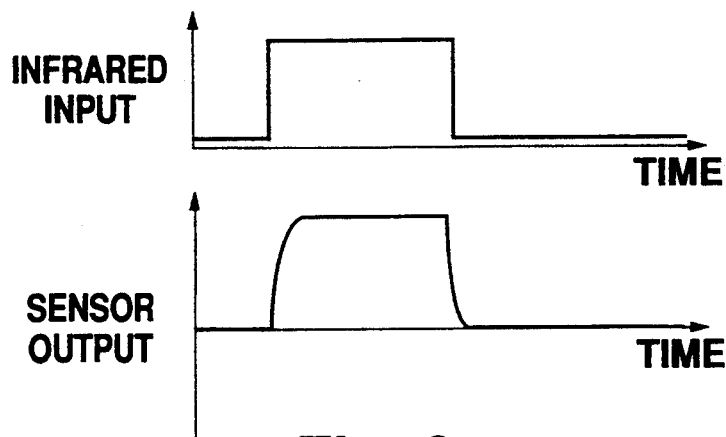
FIG. 8 illustrates an output wave with respect to the fluctuation in the infrared input obtained when using the infrared detector of the present Invention, in particular, a thermopile sensor.

FIG. 8 shows a waveform obtained when the thermopile sensor is employed. In this case, the graph suffers the same fluctuation as in the input infrared rays.

Figure 5:
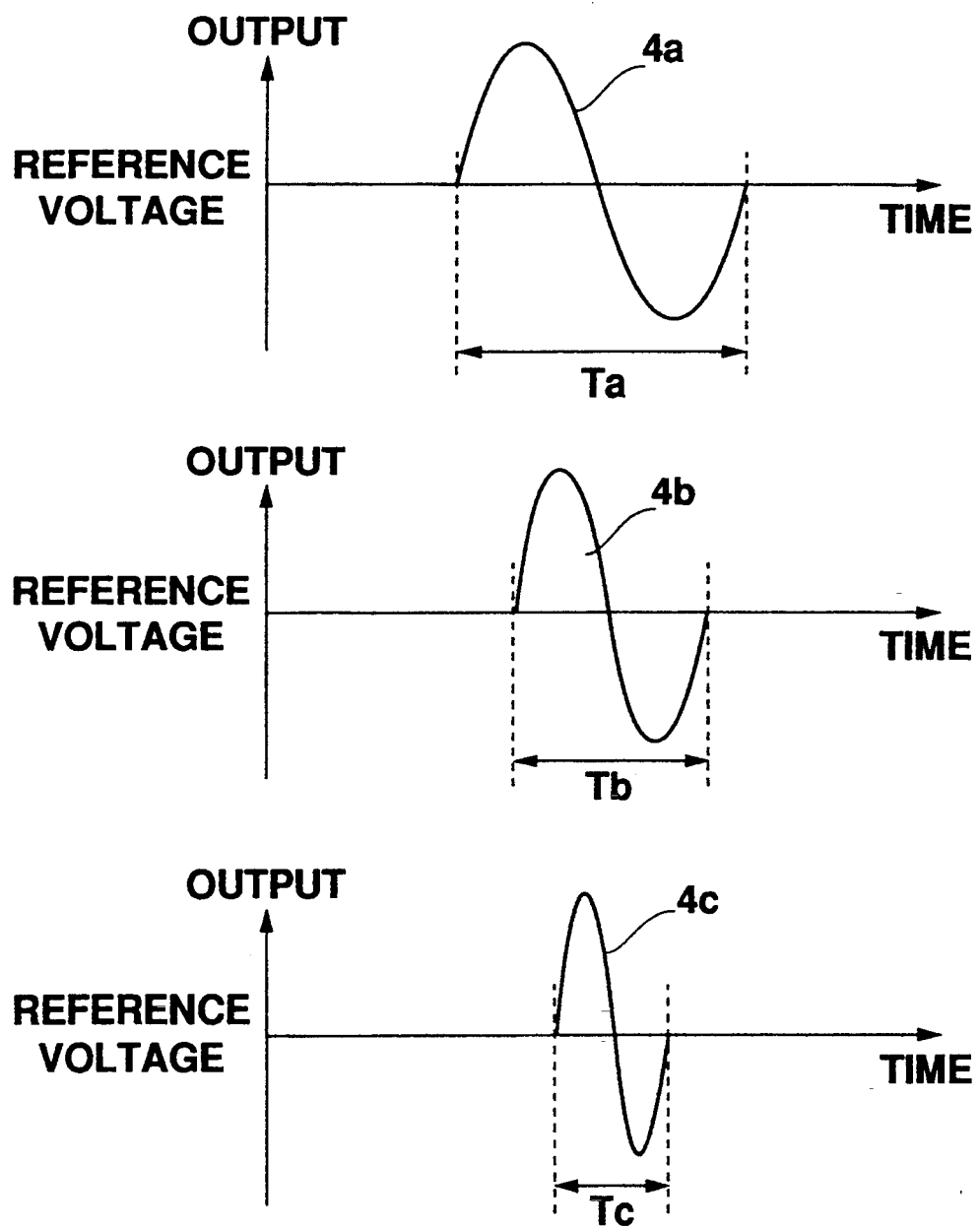
FIG. 5 illustrates waveforms of outputs supplied from the infrared detector showing the first embodiment of the present invention.

Providing that the human body moves at a constant speed across the partial detection region 1A in the direction indicated by an arrow 7A in FIG. 1, the infrared detector 4 is allowed to produce the outputs 4a depicted in FIG. 5 for the duration from the time when the human body enters the effective detection region 2A to the time when it leaves the effective detection region 2A. Here, Ta represents a time from the generation of the output 4a to the extinction thereof.

Furthermore, provided that the human body moves across the partial detection region 1B at the same speed as the foregoing speed in the direction indicated by an arrow 7B in FIG. 1, the infrared detector 4 is permitted to produce the output 4b during a time Tb. Here, as compared the output 4b with the output 4a, the time Tb is shorter than the time Ta, since the length of the effective detection region 2B across which the human body moves is less than that of the effective detection region 2A.

in the same manner, when the human body moves across the partial detection region 1C in the direction indicated by an arrow 7C in FIG. 1, the infrared detector 4 is caused to emit the output 4e during a time Tc which is even shorter than the time Tb. Thus, by differently setting the lengths or areas of the effective detection regions 2A to 2C contained in the partial detection regions 1A to 1C, respectively, waveforms of the outputs 4a to 4c produced by the infrared detector 4 in response to the movement of the human body can also be different from one another. Therefore, based on the difference in length of the times Ta to Tc during which the waveforms, respectively, representing the outputs 4a to 4c fluctuate, the decision apparatus 6 can specify the region through which the human body may have passed among the effective detection regions 2A to 2C, or the partial detection region 1A to 1C. In order to lead to the same decision, the time Ta to Tc during which the waveforms fluctuate may be considered as frequencies of the waveforms. It is to be noted for the use of the thermopile sensor that although not a sinusoidal wave the partial detection regions can be specified based on the difference in the output time.

As illustrated in FIG. 2, the outputs 4a to 4c are input to the decision apparatus 6 via an amplifier 5. The decision apparatus 6 analyzes the fluctuation times Ta to Tc or frequencies of the outputs 4a to 4c as described above, and based on the resultant analysis specifics the region within which the human body exists among the partial detection regions 1A to 1C. It is to be appreciated that the decision apparatus 6 may compare amplitudes of the outputs 4a to 4c with a predetermined value, detect the duration time of a segment having larger amplitude than the predetermined value as a human body detection time, and based on the duration of the amplitude larger than the predetermined value, specify the region through which the human body may pass among the effective detection regions 2A to 2C or the partial detection regions 1A to 1C.

In this manner, the condenser 3 may be used for arbitrarily changing the lengths or the areas of the effective detection regions 2A to 2C corresponding to the partial detection regions 1A to 1C, respectively, thereby enabling the fluctuation times or frequencies of the outputs 4a to 4c associated with the partial detection regions 1A to 1C, respectively, to be arbitrarily changed. Thus, through the detection and decision of the fluctuation times Ta to Tc or the frequencies of the outputs 4a to 4c, respectively, it can be judged which region issues the output concerned among the partial detection regions 1A to 1C. As a result, when the human body moves across any one of the partial detection regions 1A to 1C as shown in FIG. 8, a position where the human body exists can be judged.

The following is a description of a concrete example of analyzing and judging waveforms by means of the decision apparatus 6.

Figure 9A:
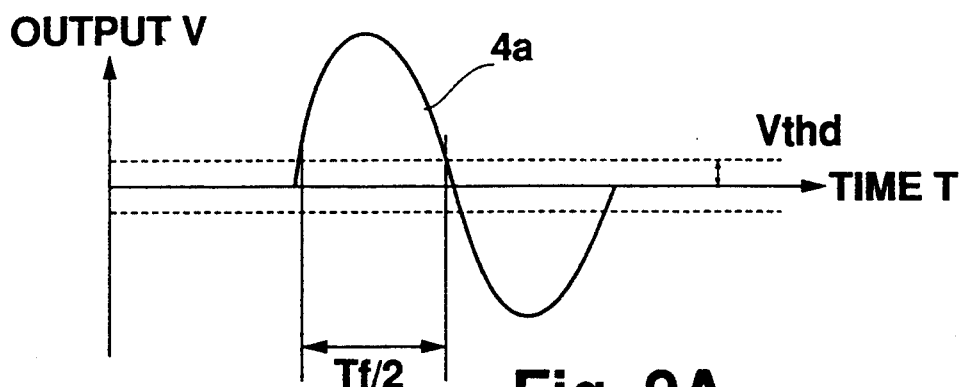
FIGS. 9A and 9B illustrate an output waveform and an argorithm of signal processing, respectively, for explaining a way of decision used when analyzing the waveform in the decision apparatus of the present invention.

FIG. 9A shows a concrete example for converting analog data into digital data by way of a microcomputer A/D converter and for measuring a time during which a signal oscillates beyond a constant level (V thd) from the reference voltage. Then, this duration is considered as a half period to find a frequency (F), finally judging which partial detection region has issued the signal having the obtained frequency.

in the decision means 6, by way of example, analog voltage outputs supplied from the amplifying means 5 are converted into digital data, and the obtained data are subjected to a signal processing by the microcomputer to judge the detection area.

Figure 9B:
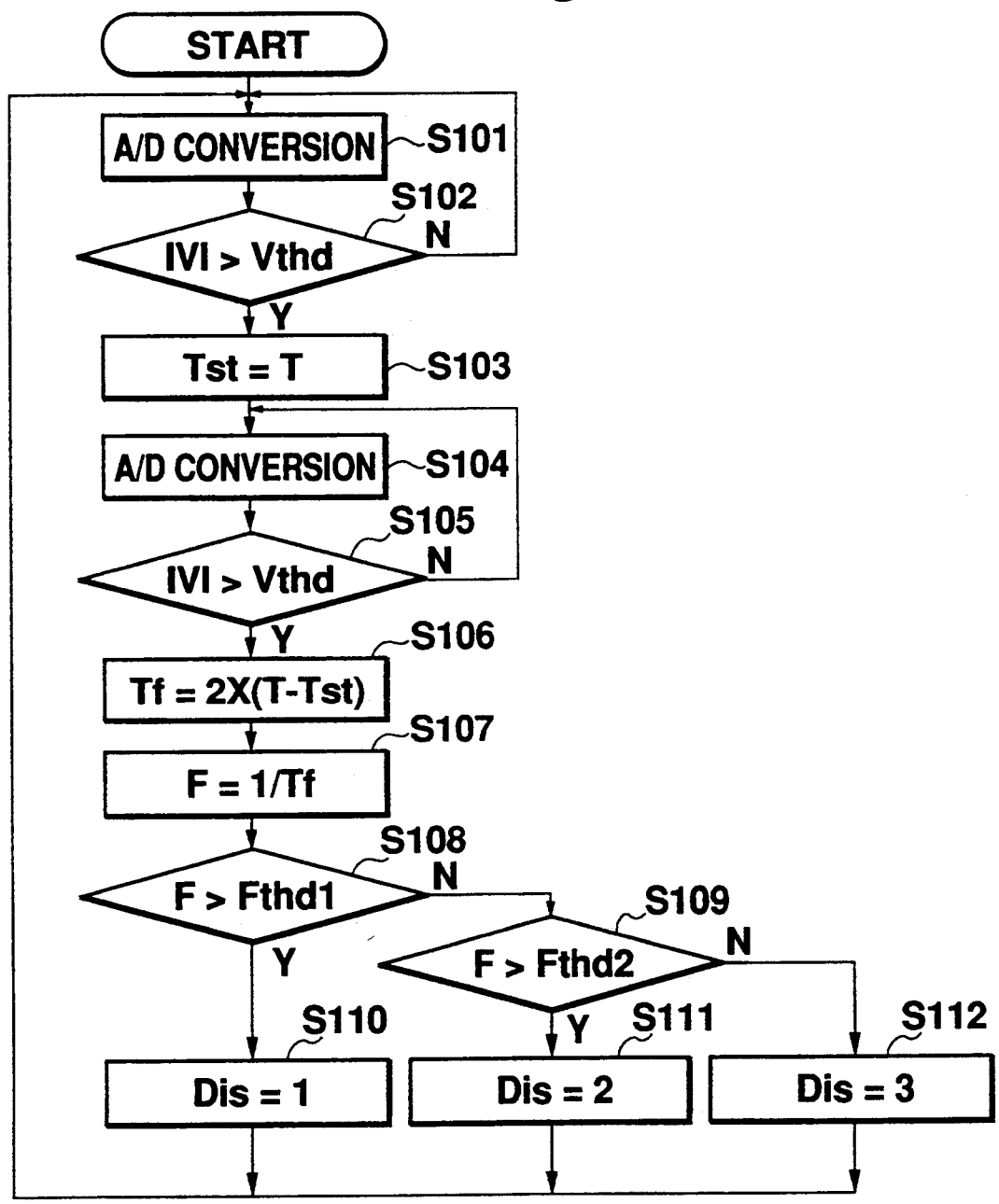

FIG. 9B shows an algorithm in which a frequency of a waveform is found with the aid of a microcomputer, to finally judge the partial detection region through which the human body has passed based on the thus obtained frequency.

First, an analog-to-digital converter serves to convert a deviation of a sensor output analog signal from the reference voltage into a digital value (V) (Step 101). It is then judged whether the digitized deviation exceeds a constant value (V thd) (Step 102). If the deviation is not more than the constant value, the A/D conversion is continued. If more than the constant value, the time when the A/D conversion has been carried out is held as a signal start time (Tst) (Step 103). After further A/D conversion (Step 104), it is monitored whether the deviation becomes less than the constant value (V thd) or not (Step 105). That is, if the A/D conversion value is not less than the constant value (V thd), the A/D conversion is continued. When the A/D conversion value is less than the constant value, a half-wave termination is detected to proceed to the next processing. Let one period (Tf) be equal to a value obtained by doubling a difference between a half-wave termination time (current time T) and the signal start time (Tst) (Step 106). Then, let the frequency (F) be equal to the reciprocal (1/Tf) of the period (Step 107). Here, assuming three partial detection regions, there are provided two frequency decision values (F thd) with which the obtained frequency is to be compared for judgment in three ways (Steps 108, 109). That is, a waveform having the largest frequency is judged to represent the smallest detection region since the distance across which the human body moves is smallest. On the contrary, a waveform having the smallest frequency is judged to represent the largest detection region (Step 110 to 112).

It is to be noted in this case that the signal start criterion is not necessarily the same as the termination criterion. In lieu of the frequency, the period or half period may be employed to discriminate the detection regions. Also, a logic circuit may be provided to obtain the same effect.

Although three partial detection regions 1A to 1C are provided in 1×3 one-dimensional arrangement in this embodiment 1, any plurality of rows of regions are applicable. Also, the partial detection regions may be two-dimensionally provided in, for example, 2×2 or 3×3 arrangement to achieve substantially the same effect as the foregoing.

Embodiment 2

Figure 10:
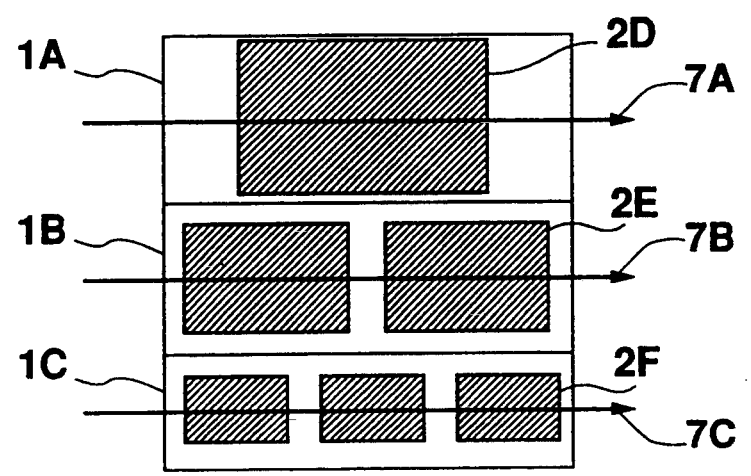
FIG. 10 shows a configuration of detection regions in accordance with the second embodiment of the present invention.
Figure 11:
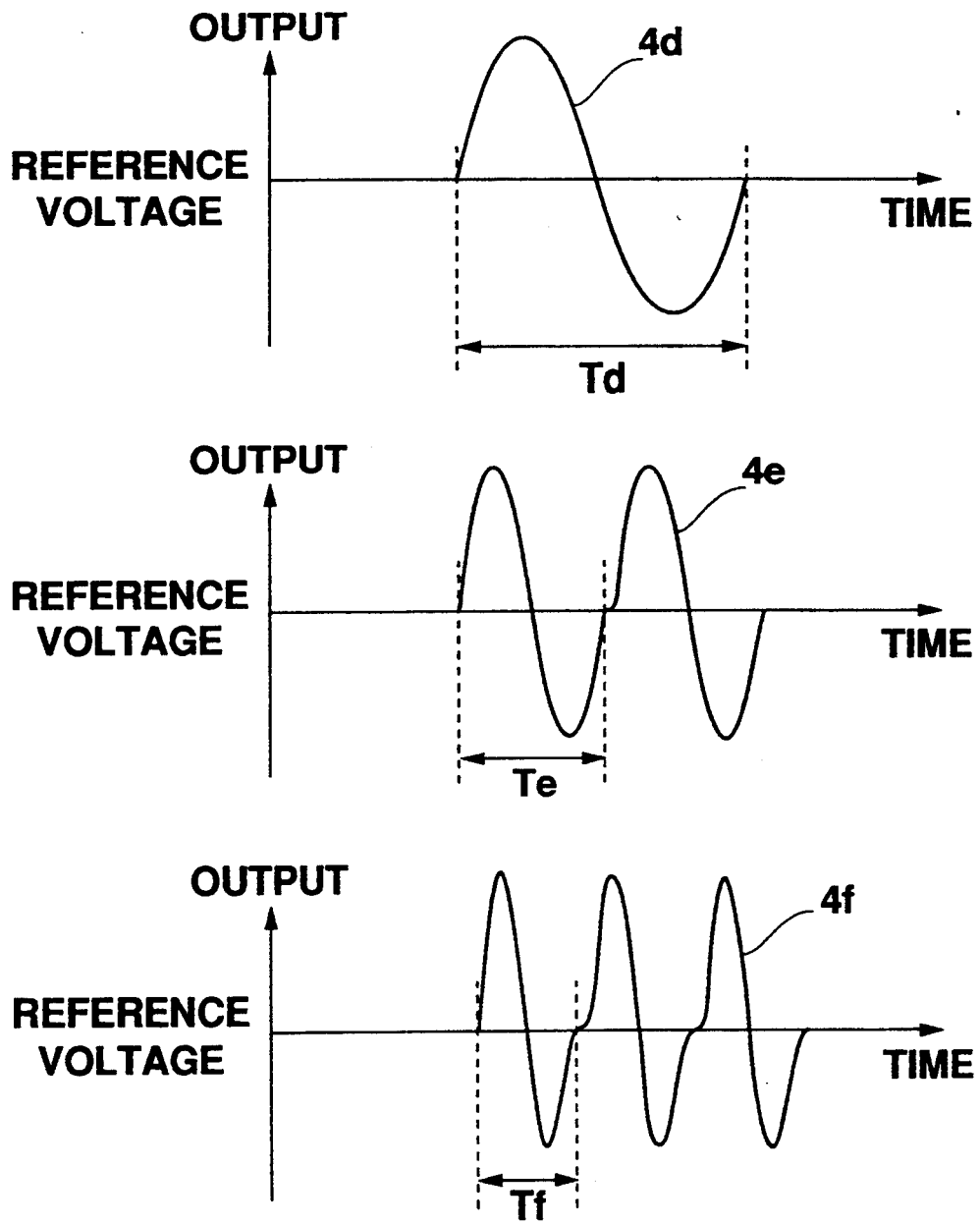
FIG. 11 illustrates output waveforms derived from the infrared detector showing the second embodiment of the present invention.
Figure 12:
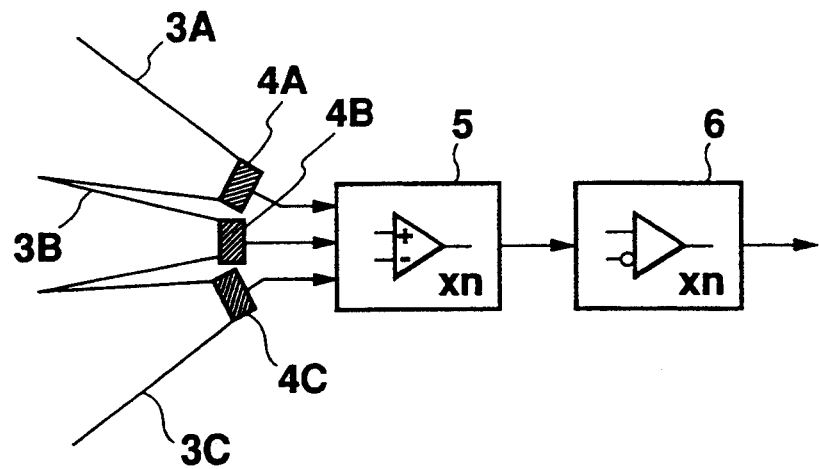
FIG. 12 is a block diagram showing the conventional system for detecting a human body.
Figure 13:
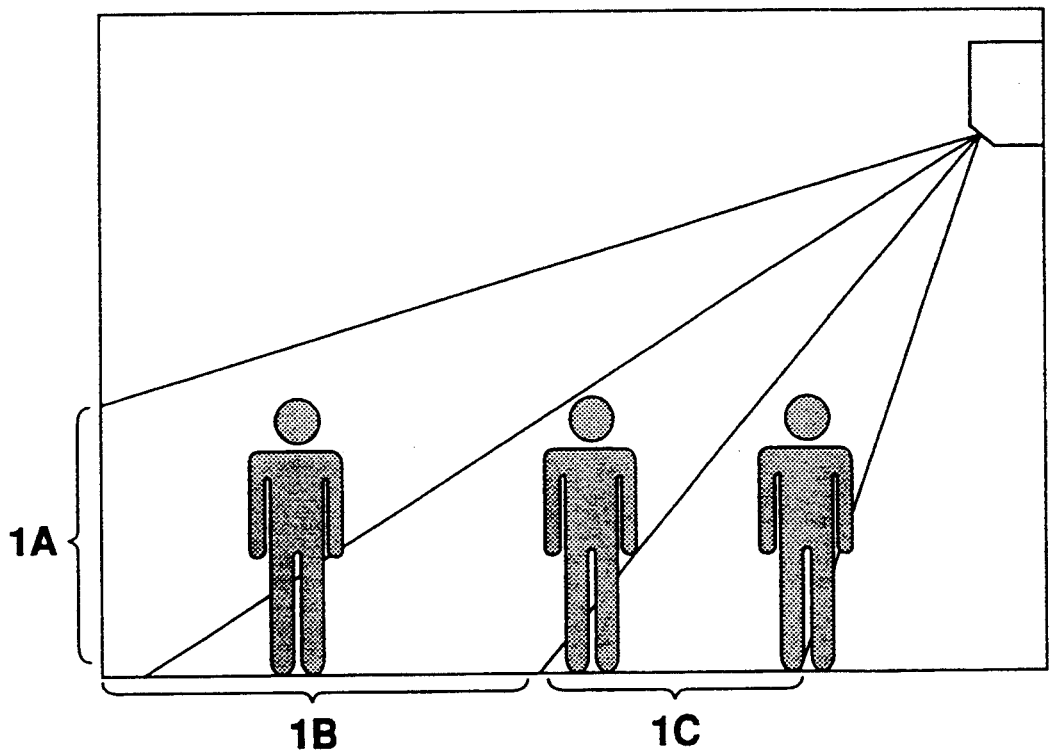
FIG. 13 is an explanatory diagram for the detection of a position where the human body exists.

FIGS. 10 and 11 illustrate a second embodiment of the present invention and are a diagram showing the configuration of detection regions and graphs showing output waveforms supplied from the infrared detector, respectively. It is to be noted that the overall block diagram shown in FIG. 2 is applicable to this embodiment as well.

This embodiment is the same as the first embodiment except that there are provided one effective detection region 2D, two effective detection region 2E, and three effective detection regions 2F, respectively, within a partial detection region 1A, partial detection region 1B, and partial detection regions 1C.

It will be easily understood from the description of the first embodiment that if a human body moves across the partial detection regions 1A to 1C in directions indicated by arrows 7A to 7C, respectively, outputs 4d to 4f of the infrared detector 4 present waveforms as shown in FIG. 11, respectively. In this case, a fluctuation time Te of one pulse of the output 4e is shorter than a fluctuation time Td of one pulse of the output 4d, and the number of the waveforms is two corresponding to the number of the effective detection regions 2E within the partial detection region (1B). The reason why the output 4e presents such waveforms is that the length of each of the effective detection regions 2E is smaller than the length of the effective detection region 2D, and that the number of the effective detection regions 2E is larger than that of region 2D. In the same manner, a fluctuation time Tf of one pulse of the output 4f is shorter than a fluctuation time Te, and the number of the waveforms of the output 4f is three.

In this way, by changing the lengths, areas or numbers of the effective detection region 2D to 2F within the partial detection region 1A to 1C, respectively, the waveforms of the outputs 4d to 4f can also be changed correspondingly. As a result, based on the fluctuation frequency of the waveform and the number of waveforms, the decision apparatus 6 can specify the region across which the human body may have moved among the effective detection regions 2D to 2F, that is, the partial detection region 1A to 1C. The second embodiment is capable of lessening ineffective detection areas within the respective partial detection areas, thereby ensuring a higher detection accuracy than the first embodiment.

Although the partial detection region 1A to 1c are one-dimensionally arranged in this embodiment, a two-dimensional, for example, 2×2 or 3×3 arrangement is also applicable. Furthermore, each of the partial detection regions 1A to 1C may include two-dimensionally arranged effective detection regions 2D to 2F, respectively.

According to the first aspect of the present invention as described hereinbefore, the condenser comprises a plurality of partial detection regions each having an elongated zone, and a plurality of effective detection regions each contained within a corresponding one of the partial detection regions, each of the partial detection regions including one of the effective detection regions each having a different area. The condenser gathers infrared rays radiated from a human body who may exist within any one of the effective detection regions, and hence the infrared rays from the associated effective detection region are converted into electric signals, thereby specifying the effective detection region within which the human body may exist based on the frequencies of the electric signals or the fluctuation times thereof, that is, specifying the partial detection region which may include the human body.

Moreover, depending on the difference in the areas of the effective detection region, there can be easily changed the frequencies or the fluctuation times of the electric signals obtained by converting a plurality of condensed infrared rays. Accordingly, the infrared detector, amplifier and decision apparatus (or a binarization apparatus is also available) may be integrated into a single equipment, thus reducing the number of the constituent elements in the system, which contributes to a reduction in the production cost as well as easy miniaturization.

According to the second aspect of the present invention, the condenser comprises a plurality of partial detection regions each having an elongated zone, and a plurality of effective detection regions each contained within a corresponding one of the partial detection regions, each of the partial detection regions including the effective detection region(s) whose number and area vary. The condenser gathers infrared rays radiated from a human body who may exist within any one of the effective detection regions, and hence the infrared rays from the associated effective detection region are converted into electric signals, thereby specifying the effective detection region within which the human body may exist based on the frequencies of the electric signals or the fluctuation times thereof, that is, specifying the partial detection region which may include the human body.

Moreover, depending on the difference in the areas and numbers of the effective detection regions, there can be easily changed the frequencies or the fluctuation times of the electric signals obtained by converting a plurality of condensed infrared rays. Accordingly, the infrared detector, amplifier and decision apparatus (or a binarization apparatus is also available) may be integrated into a single equipment, thus reducing the number of constituent elements in the system, which contributes to a reduction in the production cost as well as easy miniaturization.

The provision of a plurality of detection regions within one partial detection region enables the ineffective detection regions in the partial detection regions to be reduced, thereby improving the accuracy with which the infrared rays are detected.

Additionally, according to the first and second aspects of the present invention, there are provided a plurality of multisegment Fresnel lenses each having a different focal length corresponding to the associated effective region, thus enabling the infrared rays derived from the effective detection regions having different areas to be condensed on a uniform area of the light receiving element. As a result, a single condenser has only to be disposed irrespective of the provision of a plurality of partial detection regions containing effective detection region(s).

What is claimed is:

1. A system for detecting a human body, comprising:
   (a) a condenser including a plurality of partial detection regions each having an elongated zone, and a plurality of effective detection regions each having a different area and correspondingly contained within each of said partial detection regions, said condenser condensing infrared rays radiated from the human body which may exist within one of said effective detection regions;
   (b) an infrared detector for converting the infrared rays condensed on said effective detection regions through said condenser into electric signals;
   (c) an amplifier for amplifying the electric signals derived from said infrared detector;
   (d) a decision apparatus which detects fluctuation times or frequencies of the electric signals amplified by said amplifier and corresponding to said effective detection regions, specifies the effective detection regions having areas corresponding to thus detected fluctuation times or frequencies, and specifies partial detection regions containing said effective detection regions to judge a position where the human body may exist.

2. A human body detecting system according to claim 1, wherein said partial detection regions each contain one effective detection region.

3. A human body detecting system according to claim 1, wherein said condenser includes a plurality of multisegment Fresnel lenses each having a different focal length corresponding to each of said effective detection regions so that infrared rays emitted from said effective detection regions having different areas are condensed on a uniform area of a light receiving element.

4. A human body detecting system according to claim 1, wherein said infrared detector converts a distribution of the infrared rays condensed with a movement of the human body by said condenser into output signals oscillating up and down from a reference voltage.

5. A human body detecting system according to claim 4, wherein said decision apparatus has a predetermined amplitude previously provided with respect to the output signals, compares amplitudes of output signals from said effective detection regions with said predetermined amplitude, detects a duration of a segment having larger amplitude than said predetermined amplitude as a human body detection time, and specifies the partial detection region based on the duration of the human body detection time to judge a position where the human body may exist.

6. A system for detecting a human body, comprising:
   (a) a condenser including a plurality of partial detection regions each having an elongated zone, and a plurality of effective detection regions each contained within one of said partial detection regions, said partial detection regions each containing at least one said effective detection regions whose number and area vary; said condenser condensing infrared rays radiated from the human body which may exist within one of said effective detection regions;
   (b) an infrared detector for converting the infrared rays condensed on said effective detection regions through said condenser into electric signals;
   (c) an amplifier for amplifying the electric signals derived from said infrared detector; and
   (d) a decision apparatus which detects fluctuation times or frequencies and the number of the electric signals amplified by said amplifier and corresponding to said effective detection regions, specifies the effective detection regions having areas corresponding to thus detected fluctuation times or frequencies and having the number of regions corresponding to thus detected number of the electric signals, and specifies partial detection regions containing said effective detection regions to judge a position where the human body may exist.

7. A human body detecting system according to claim 6, wherein said condenser includes a plurality of multisegment Fresnel lenses each having a different focal length corresponding to each of said effective detection regions so that infrared rays emitted from said effective detection regions having different areas are condensed on a uniform area of a light receiving element.

8. A human body detecting system according to claim 6, wherein said infrared detector converts a distribution of the infrared rays condensed with a movement of the human body by said condenser into output signals oscillating up and down from a reference voltage.

9. A human body detecting system according to claim 8, wherein said decision apparatus has a predetermined amplitude previously provided with respect to one pulse of the output signal, compares amplitudes of one pulse of output signal from each of said effective detection regions with said predetermined amplitude, detects a duration of a segment having larger amplitude than said predetermined amplitude as a human body detection time, and specifies the partial detection region based on the duration of the human body detection time and the number of the human body detection times to judge a position where the human body may exist.

* * * * *